(12) United States Patent
Ahmed (10) Patent No.: US 12,003,402 B2
(45) Date of Patent: Jun. 4, 2024

(54) PORT DISCOVERY VIA PASSIVE INTERNET GROUP MANAGEMENT PROTOCOL SNOOPING NEIGHBORS

(71) Applicant: ARRIS Enterprises LLC, Suwanee, GA (US)

(72) Inventor: Mohammad Nasir Ahmed, Bangalore (IN)

(73) Assignee: Ruckus IP Holdings LLC, Claremont, NC (US)

( * ) Notice: Subject to any disclaimer, the term of this patent is extended or adjusted under 35 U.S.C. 154(b) by 194 days.

(21) Appl. No.: 17/583,420

(22) Filed: Jan. 25, 2022

(65) Prior Publication Data

US 2022/0247664 A1 Aug. 4, 2022

Related U.S. Application Data

(60) Provisional application No. 63/144,662, filed on Feb. 2, 2021.

(51) Int. Cl.
*H04L 45/02* (2022.01)
*H04L 45/16* (2022.01)
*H04L 45/74* (2022.01)

(52) U.S. Cl.
CPC .............. *H04L 45/02* (2013.01); *H04L 45/16* (2013.01); *H04L 45/74* (2013.01)

(58) Field of Classification Search
None
See application file for complete search history.

(56) References Cited

U.S. PATENT DOCUMENTS

| 6,865,160 | B1* | 3/2005 | Bare | H04L 45/24 370/256 |
|---|---|---|---|---|
| 2005/0041665 | A1* | 2/2005 | Weyman | H04L 45/16 370/390 |
| 2011/0103382 | A1 | 5/2011 | Kim et al. | |
| 2014/0003434 | A1* | 1/2014 | Assarpour | H04L 69/22 370/392 |
| 2014/0254604 | A1* | 9/2014 | Janardhanan | H04L 45/18 370/401 |
| 2017/0085622 | A1 | 3/2017 | Gopinath et al. | |
| 2022/0094601 | A1* | 3/2022 | Dutta | H04L 45/26 |

OTHER PUBLICATIONS

"European Search Report in corresponding patent application No. 22154650.0, dated Jun. 27, 2022, 10 pages".

* cited by examiner

*Primary Examiner* — Xavier S Wong
(74) *Attorney, Agent, or Firm* — Steven Stupp (57) ABSTRACT

A computer network device (such as a switch or a router) that implement a passive snooping communication protocol is described. During operation, the computer network device may receive an instance of a message from a second computer network device in a network via a port (such as a router port) associated with a link between the computer network device and the second computer network device. Based at least in part on the received instance of the message, the computer network device may identify the port as being a type of port (such as a passive neighbor port and a non-edge port in the network), and may not forward the instance of the message to one or more additional computer network devices via one or more additional ports (such as one or more additional router ports).

20 Claims, 5 Drawing Sheets

PORT DISCOVERY VIA PASSIVE INTERNET GROUP MANAGEMENT PROTOCOL SNOOPING NEIGHBORS

CROSS REFERENCE TO RELATED APPLICATIONS

This application claims priority under 35 U.S.C. 119(e) to: U.S. Provisional Application Ser. No. 63/144,662, "Port Discovery Via Passive Internet Group Management Protocol Snooping Neighbors," filed on Feb. 2, 2021, by Mohammad Nasir Ahmed, the contents of which are herein incorporated by reference.

FIELD

The described embodiments relate to techniques for discovering ports in a network using passive Internet group management protocol (IGMP) snooping or Multicast Listener Discovery (MLD) snooping by computer network devices (such as routers and/or switches).

BACKGROUND

IGMP is a communications protocol used by hosts and adjacent computer network devices in Internet Protocol (IP) networks to establish multicast group memberships. IGMP facilitates IP multicast and allows the network to direct multicast transmissions to hosts that have requested them.

Moreover, 'IGMP snooping' is a process of listening to IGMP network traffic to control delivery of IP multicasts. Computer network devices use IGMP snooping to listen in on the IGMP communication or conversation between hosts and computer network devices to develop and maintain a map of the links associated with the IP multicast transmissions.

In order to enable support for advance features, such as software defined video-over-Ethernet (SDVoE), a computer network device typically needs to be able to segregate edge ports and non-edge ports. However, many implementations of IGMP snooping lack a built-in capability to identify edge and non-edge ports.

In principle, the ability to segregate edge ports and non-edge ports in IGMP snooping may be added using static provisioning, such as via a command line interface (CLI). Static provisioning typically requires manually identifying and configuring of the edge ports and the non-edge ports via the CLI. However, manual configuration is error-prone and usually requires constant support from a network administrator in order to accommodate dynamic changes to the network topology.

Alternatively, the ability to segregate edge ports and non-edge ports in IGMP snooping may be added using dynamic discovery. In dynamic determination of non-edge ports, computer network devices that use IGMP snooping may learn the presence of a querier via a general query (Q) message. Note that ports where query messages are received are known as 'router ports.' Moreover, a query message may propagate across a virtual local area network (VLAN) domain, and each of the computer network devices receiving the query message may dynamically detect the router ports.

However, knowledge of router ports is usually insufficient information to allow the presences of other computer network devices running IGMP snooping in a network to be detected. The presence of other switches may be detected using a variety of layer 2 (L2) protocols, such as a link layer discovery protocol (LLDP) or a spanning tree protocol (STP).

Nonetheless, using a given one of the L2 protocols, a computer network device typically is not able to determine if another computer network device is using IGMP snooping or not. Moreover, many L2 protocols require manual configuration and careful network deployment planning. Furthermore, because of management overhead, customer often do not want to configure L2 protocols in their networks. The difficulties in discovering different types of ports in computer network devices and which computer network devices are running IGMP snooping can degrade the performance of the computer network device and/or a network that includes the computer network device.

SUMMARY

A computer network device (such as a switch or a router) that implement a passive snooping communication protocol is described. This computer network device may include: an interface circuit; a processor; and a memory that stores program instructions, where, when executed by the processor, the program instructions cause the computer network device to perform operations. Notably, during operation, the computer network device receives an instance of a message from a second computer network device in a network via a port (such as a router port) associated with a link between the computer network device and the second computer network device. Based at least in part on the received instance of the message, the computer network device identifies the port as being a type of port, and does not forward the instance of the message to one or more additional computer network devices via one or more additional ports (such as one or more additional router ports).

Moreover, the computer network device provides additional instances of the message to the second computer networking device via the port and to the one or more additional computer network devices via the one or more additional ports. Note that the additional instances of the message may be provided periodically. For example, the additional instances of the message may be provided after a predefined time interval (such as 260 s) during which the computer network device listens for communication associated with a host (such as a response associated with the host).

Furthermore, the computer network device provides an additional instance of the message to a given additional computer network device in the one or more additional computer network devices via a given additional port in the one or more additional ports that has not already been identified as being the type of port or has not already been identified as not being the type of port.

Additionally, the type of port may include a passive neighbor port.

Note that the port may be a non-edge port in the network.

When the computer network device receives another type of message via another port from a host in the network, the computer network device may provide the other type of message to the second computer network device via the port. However, the computer network device may suppress forwarding of the other type of message to the host. Thus, the computer network device may selectively provide or forward the other type of message based at least in part on identified instances of the type of port. Note that the other type of message may include an IGMP report or leave message (which may be an IGMP group addressed message). More generally, when the computer network device receives an IGMP report or leave message, the computer network device may forward the IGMP report or leave message via non-edge ports in the network.

Additionally, the computer network device may compute a topology of the network based at least in part on received instances of the message. The topology may specify non-edge ports in the network and edge ports in the network.

Moreover, the passive snooping communication protocol may include a passive IGMP snooping neighbors protocol.

Note that the type of message may include a passive neighbor message.

Another embodiment provides a computer-readable storage medium for use with the computer network device. When executed by the computer network device, this computer-readable storage medium causes the computer network device to perform at least some of the aforementioned operations.

Another embodiment provides a method, which may be performed by the computer network device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer network device (such as a switch or a router) that implement a passive snooping communication protocol is described. During operation, the computer network device may receive an instance of a message from a second computer network device in a network via a port associated with a link between the computer network device and the second computer network device. Based at least in part on the received instance of the message, the computer network device may identify the port as being a type of port (such as a passive neighbor port and a non-edge port in the network), and may not forward the instance of the message to one or more additional computer network devices via one or more additional ports (such as one or more additional router ports).

By exchanging instances of the message, these communication techniques may allow the computer network device to identify edge ports and non-edge ports in the network. More generally, the communication techniques may allow the computer network device to compute a topology of the network based at least in part on identified instances of the type of port. Moreover, the topology may indicate or correspond to the second computer network device and/or the one or more additional computer network devices that implement the passive snooping communication protocol (and which may not require the use of a L2 protocol). Consequently, the communication techniques may allow the computer network device to compute information needed to enable support for advance features, such as SDVoE. Furthermore, the communication techniques may improve the performance of the computer network device and/or the network that includes the computer network device.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), and/or another type of wireless interface. In the discussion that follows, Wi-Fi is used as an illustrative example. For example, an IEEE 802.11 standard may include one or more of: IEEE 802.11a. IEEE 802.11b, IEEE 802.11g, IEEE 802.11-2007, IEEE 802.11n. IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11 ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

Figure 1:
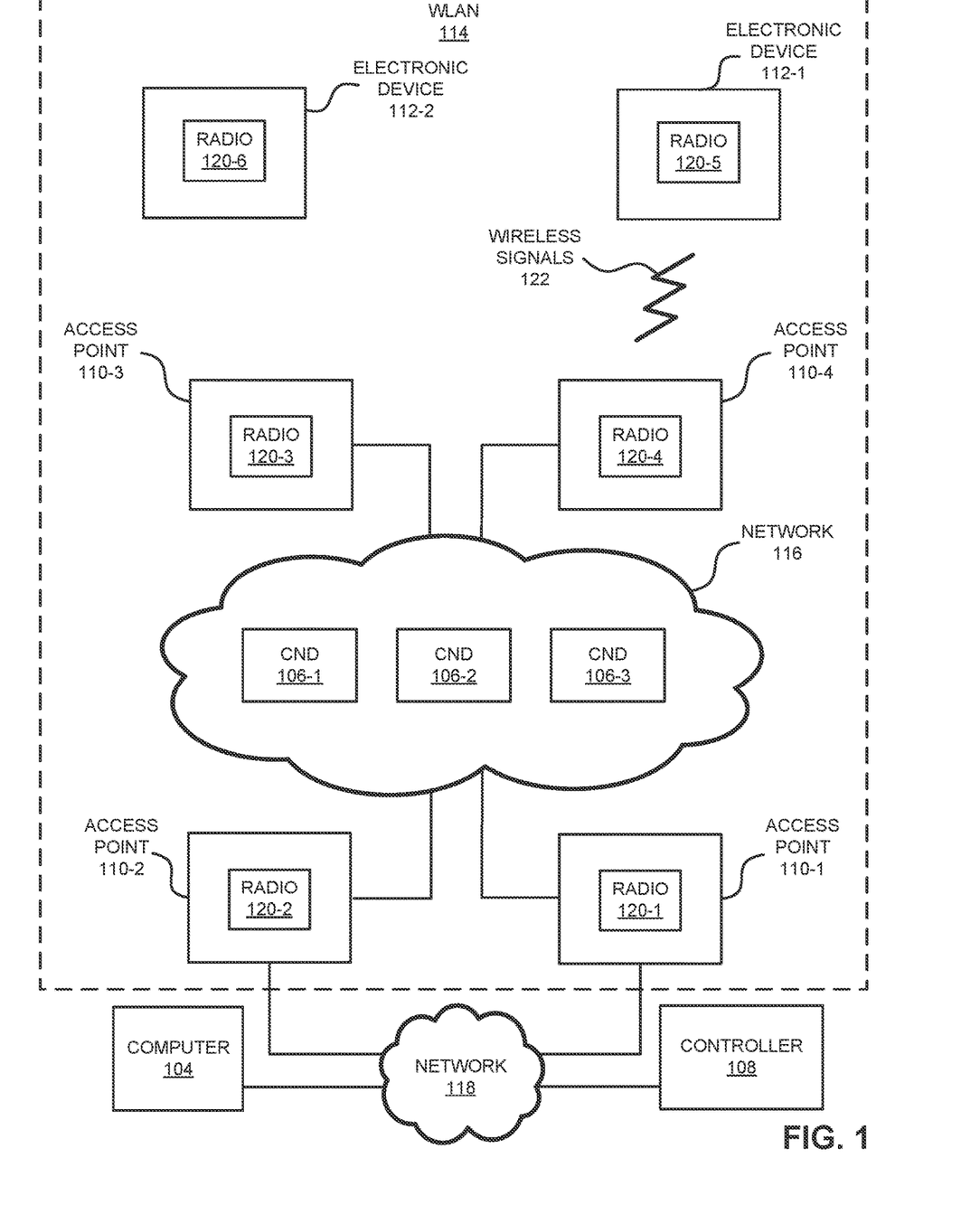
FIG. 1 is a block diagram illustrating an example of communication among access points, electronic devices and computer network devices in a network in accordance with an embodiment of the present disclosure.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include computer network devices (CND) 106 (e.g., a switch or a router). In some embodiments, the one or more computer network device 106 may include a stack of multiple computer network devices (which are sometimes referred to as 'stacking units').

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 5:
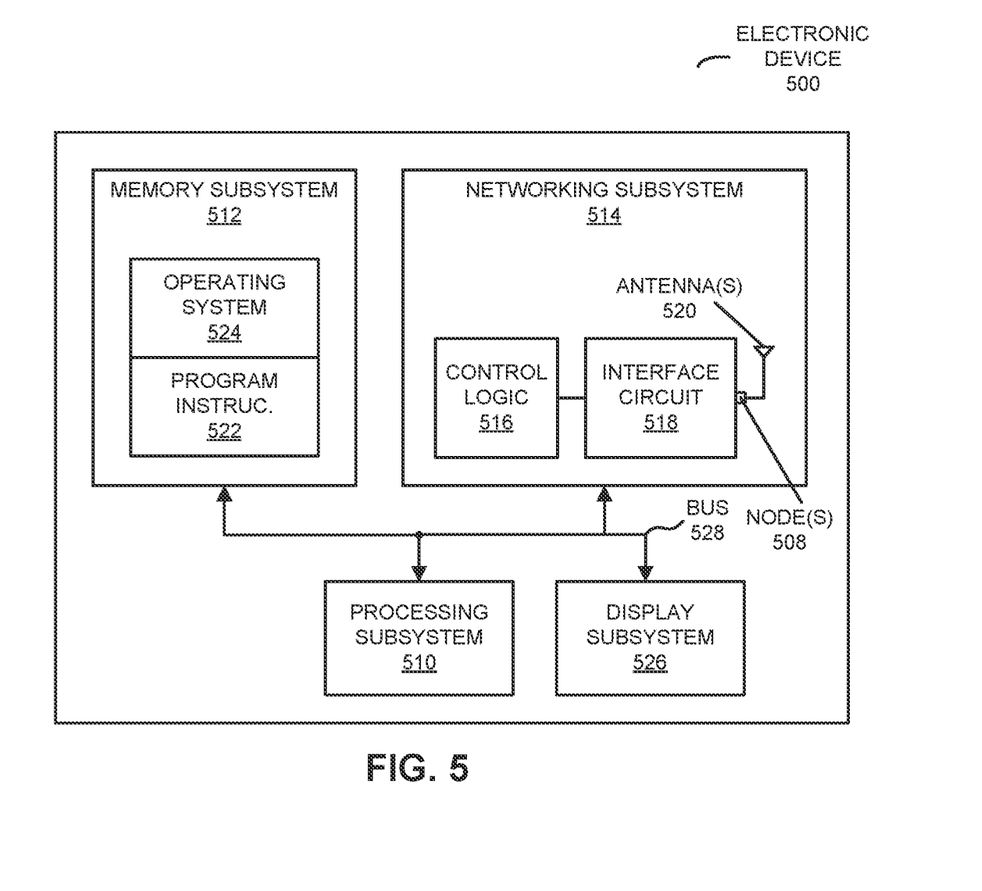
FIG. 5 is a block diagram illustrating an example of an electronic device in accordance with an embodiment of the present disclosure.

As described further below with reference to FIG. 5, the one or more computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it is often difficult to segregate edge ports and non-edge ports using existing IGMP snooping techniques. Consequently, many existing computer network devices are unable to support advanced features, which can degrade performance of the computer network devices and/or networks that include the computer network devices.

Figure 2:
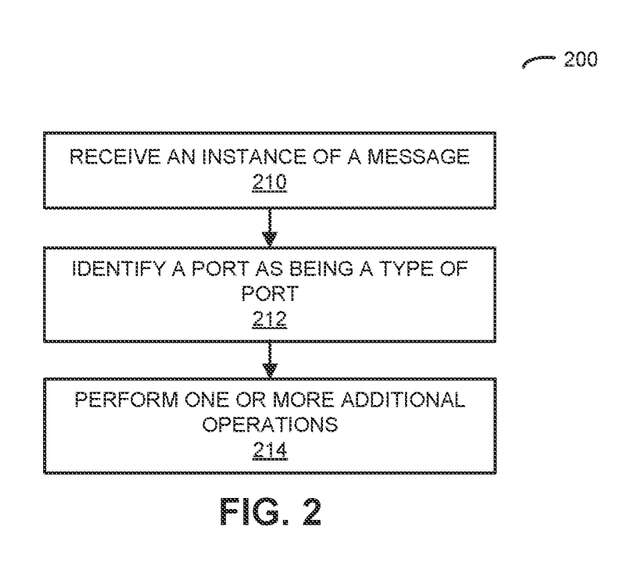
FIG. 2 is a flow diagram illustrating an example of a method for performing a passive snooping communication protocol using a computer network device in FIG. 1 in accordance with an embodiment of the present disclosure.

As described further below with reference to FIGS. 2-4, in order to address these problems, computer network devices 106 may implement a passive snooping neighbors protocol. In the discussion that follows, IGMP snooping is used as an illustrative example. However, in other embodiments, another communication protocol may be used to facilitate passive neighbors discovery.

Notably, the communication techniques may allow a computer network device (such as computer network device 106-1) that implements IGMP snooping to segregate edge ports (such as ports connected to a receiver or host or a source in a network) from non-edge ports (such as ports connected to other computer network devices 106 in the network) and, more generally, to compute or determine a topology of the network. Moreover, the communication techniques may allow computer network device 106-1 to identify one or more ports (such as router ports) associated with other computer network devices (such as computer network device 106-2) in the network that implement IGMP snooping. These capabilities of computer network device 106-1 may be facilitated by monitoring communication in the network (such as IGMP messages, e.g., IGMP report or leave messages, IGMP group addressed messages, IGMP queries, etc.) and periodically exchanging messages (such as passive monitoring messages) in the network with, e.g., computer network device 106-2 in the network, via as associated port. Note that an IGMP group addressed message may include: a source Internet Protocol address, an IGMP type, a group address, and/or other information.

Using the communication techniques, computer network device 106-1 may identify non-edge electronic devices in the network (such as computer network device 106-2). Notably, computer network device 106-1 may declare or notify computer network device 106-2 that it is a passive IGMP snooping neighbor (PIGSN), i.e., that it implements the passive IGMP snooping protocol, by periodically providing passive network messages on a port associated with a link with computer network device 106-2. Similarly, computer network device 106-2 may declare or notify computer network device 106-1 that it is a PIGSN by periodically providing passive network messages on a port associated with a link with computer network device 106-1. Note that the periodically exchanged passive network messages may be provided after a time interval (such as, e.g., 260 s).

When a given computer network device (such as computer network device 106-2) receives a passive neighbor message on a port, it may note or mark that this port is associated with a PIGSN (and that it is a non-edge port). Moreover, computer network device 106-2 may not forward the passive neighbor message to other computer network devices 106 in the network.

Similarly, after a time interval (such as, e.g., 26 W s) has elapsed, computer network device 106-2 may send a second passive neighbor message to computer network device 106-1 via the same or another port. When computer network device 106-1 receives this second passive neighbor message on a second port, it may note or mark that the second port is associated with a PIGSN (and that it is a non-edge port). Once again, computer network device 106-1 may not forward the second passive neighbor message to other computer network devices 106 in the network. Thus, the passive neighbor messages may not be propagated across the network.

Moreover, when computer network device 106-1 receives another type of message (such as an IGMP report or leave message, which may be an IGMP group addressed message) via another port from a host (such as one of electronic devices 112) in the network, computer network device 106-1 may provide the other type of message to the other computer network devices 106 via PIGSN ports. However, computer network device 106-1 may suppress forwarding of the other type of message to the host. Thus, the computer network device may selectively provide or forward the other type of message based at least in part on identified PIGSN ports or the non-edge ports in the network. In some embodiments, the other type of message is received by computer network device 106-1 from a querier in the network (e.g., computer network device 106-3), which may be a central point in a multicast group in the network that is coupled or connected to the host.

In these ways, computer network devices 106 may identify PIGSNs in the network and, thus, the edge ports and non-edge ports in the network. More generally, computer network devices 106 may compute or determine a topology of the network based at least in part on the exchanged passive neighbor messages and the associated ports. These capabilities may allow computer network devices 106 to support advanced features, which may improve the performance of computer network devices 106 and/or a network that includes computer network devices 106. Therefore, the communication techniques may improve the user experience w % ben using computer network devices 106 and/or the network that includes computer network devices 106.

We now describe embodiments of a method. FIG. 2 presents a flow diagram illustrating an example of a method 200 for performing a passive snooping communication protocol in accordance with some embodiments. This method may be performed by a computer network device (such as one of computer network devices 106 in FIG. 1).

During operation, the computer network device (such as a router or a switch) may receive an instance of a message (operation 210) from a second computer network device in a network via a port associated with a link between the computer network device and the second computer network device. Note that the type of message may include a passive neighbor message.

Then, based at least in part on the received instance of the message, the computer network device may identify the port as being a type of port (operation 212), and does not forward the instance of the message to one or more additional computer network devices via one or more additional ports (such as one or more additional router ports). Note that the type of port may include a passive neighbor port, which may be a non-edge port in the network.

In some embodiments, the computer network device may optionally perform one or more additional operations (operation 214). For example, the computer network device may provide additional instances of the message to the second computer networking device via the port and to the one or more additional computer network devices via the one or more additional ports. Note that the additional instances of the message may be provided periodically. For example, the additional instances of the message may be provided after a predefined time interval (such as 260 s) during which the computer network device listens for communication associated with a host (such as a response associated with the host).

Furthermore, the computer network device may provide an additional instance of the message to a given additional computer network device in the one or more additional computer network devices via a given additional port in the one or more additional ports that has not already been identified as being the type of port or has not already been identified as not being the type of port.

When the computer network device receives another type of message via another port from a host in the network, the computer network device may provide the other type of message to the second computer network device via the port. However, the computer network device may suppress forwarding of the other type of message to the host. Thus, the computer network device may selectively provide or forward the other type of message based at least in part on identified instances of the type of port. Note that the other type of message may include an IGMP report or leave message (which may be an IGMP group addressed message). More generally, when the computer network device receives an IGMP report or leave message, the computer network device may forward the IGMP report or leave message via non-edge ports in the network.

Additionally, the computer network device may compute a topology of the network based at least in part on received instances of the message. The topology may specify non-edge ports in the network and edge ports in the network.

In some embodiments, the passive snooping communication protocol may include a passive IGMP snooping neighbors protocol.

In some embodiments of method 200, there may be additional or fewer operations. Furthermore, the order of the operations may be changed, and/or two or more operations may be combined into a single operation.

Figure 3:
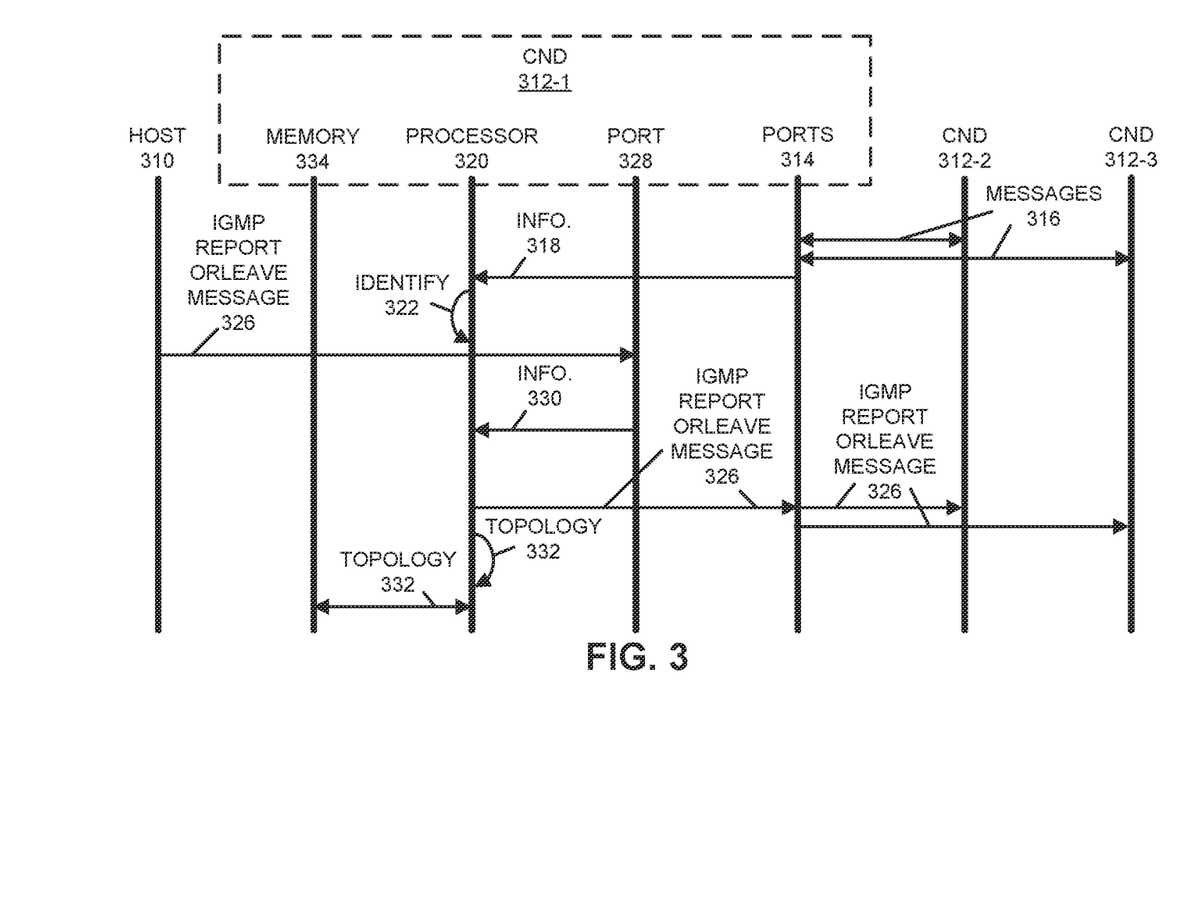
FIG. 3 is a drawing illustrating an example of communication among components in an electronic device in FIG. 1 in accordance with an embodiment of the present disclosure.

FIG. 3 presents a drawing illustrating an example of communication among host (or receiver) 310 and computer network devices 312 in a network in accordance with some embodiments. Notably, computer network devices 312 may exchange messages 316 (such as passive neighbor messages) with each other via one or more router ports (such as one or more ports 314 in computer network device 312-1) associated with one or more links between computer network devices 312.

Based at least in part on received messages 316, ports 314 may provide information 318 about or associated with received messages 316 to processor 320 in computer network device 312-1. Based at least in part on information 318 about the received messages 316, processor 320 may identify 322 the one or more ports 314 as being instances of a type of port. For example, a given instance of the type of port may be a passive neighbor port and may be a non-edge port in the network.

Next, host 310 may provide an IGMP report or leave message 326 (such as an IGMP group addressed message) to computer network device 312-1 on another port 328 (which may be an edge port in the network). After receiving the IGMP report or leave message 326, port 328 may provide information 330 about or associated with the IGMP report or leave message 326 to processor 320. Based on information 330, processor 320 may selectively provide the IGMP report or leave message 326 to a remainder of computer network devices 312 via the one or more ports 314. However, processor 320 may not provide the IGMP report or leave message 326 to host 310 or another host say (not shown). Thus, processor 320 may suppress forwarding of the IGMP report or leave message 326 to one or more other hosts based at least in part on the one or more identified ports 314 and 328.

Thus, by exchanging messages 316, computer network device 312-1 may identify edge ports and non-edge ports in the network. Using this information, computer network device 312-1 may forward the IGMP report or leave message 326 within the network via the identified non-edge ports, while suppressing forwarding of the IGMP report or leave message 326 to host 310 (which uses an edge port in the network).

Furthermore, processor 320 may compute a topology 332 of the network based at least in part on information 318 and/or information 330, where topology 332 specifies the non-edge ports and the edge ports in the network. Then, processor 320 may store information specifying topology 332 in memory 334 in computer network device 312-1. These operations may be performed one or more times as messages 316 are exchanged in the network.

While FIG. 3 illustrates communication between components using unidirectional or bidirectional communication with lines having single arrows or double arrows, in general the communication in a given operation in these figures may involve unidirectional or bidirectional communication.

Figure 4:
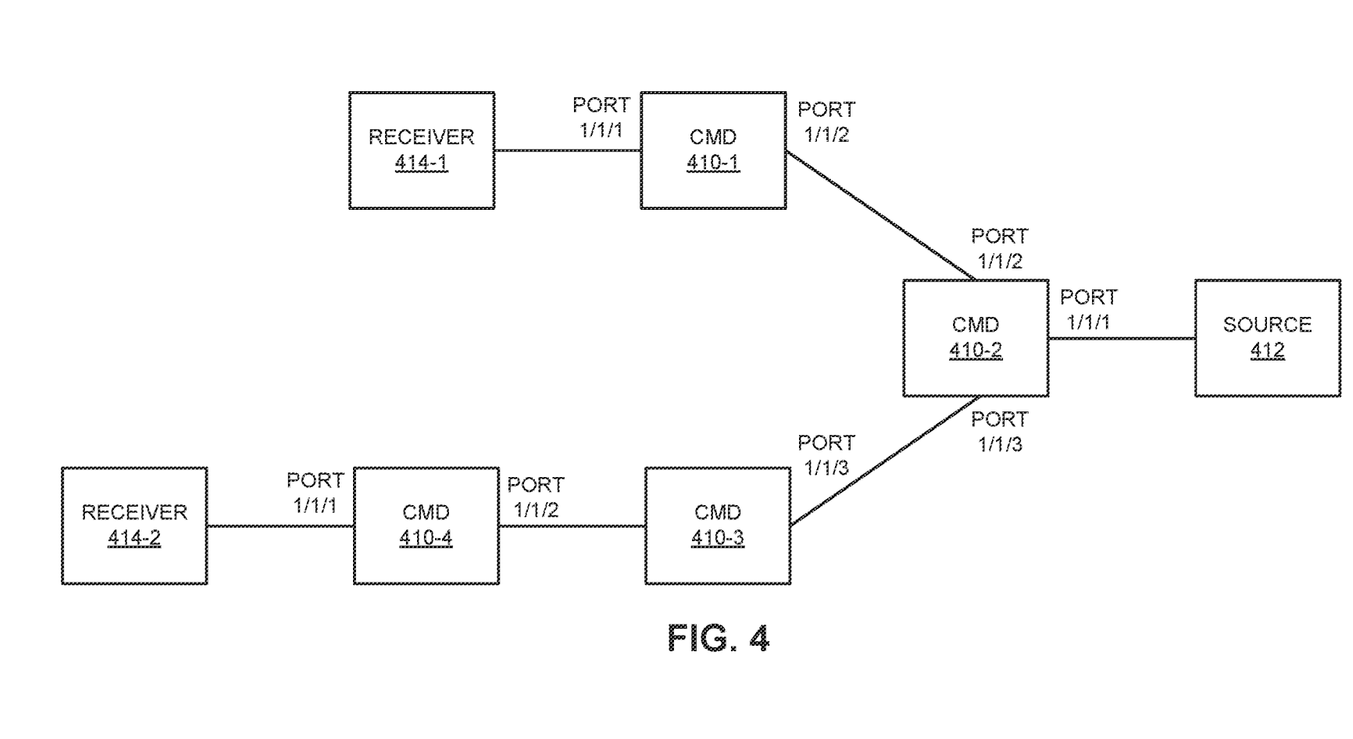
FIG. 4 is a block diagram illustrating an example of a passive IGMP snooping neighbors protocol in a network in accordance with an embodiment of the present disclosure.

FIG. 4 presents a block diagram illustrating an example of a passive IGMP snooping neighbors protocol in a network in accordance with some embodiments. The network illustrated in FIG. 4 includes computer network devices 410, a source 412, and receivers (or hosts) 414 in one or more multicast groups.

Computer network devices 410 may obtain information about the network via IGMP queries and responses or reports. For example, computer network device 410-2, which is coupled or connected to source 412, may provide IGMP queries to computer network devices 410-1 and 410-3. (However, computer network device 410-2 may not provide IGMP queries to source 412. Instead, computer network device 410-2 may be a querier in the network. In response to IGMP queries, computer network devices 410-1 and 410-3 may provide IGMP reports. Source 412, or receivers 414 may provide IGMP report or leave messages.) Then, computer network device 410-1 forwards an IGMP report to receiver 414-1. Moreover, computer network device 410-3 forwards an IGMP report to computer network device 414-4, which forwards an IGMP report to receiver 414-2. Note that one or more of receivers 414 may suppress reports, i.e., they may not respond to IGMP queries or reports. This may prevent computer network devices 410 from determining membership in the one or more multicast groups.

In the passive IGMP snooping neighbors protocol, PIG-SNs are non-querier computer network devices 410-1, 410-3 and 410-4. These computer network devices may perform the following operations. When computer network devices 410-1, 410-3 and 410-4 detect that they are PIGSNs, they start sending passive neighbor messages to each other on router ports. The passive neighbor messages do not propagate across the network, e.g., to source 412 or receivers 414. The computer network devices 410-1, 410-3 and 410-4 that receive an instance of a passive neighbor message may mark the receive port(s) as being associated with a passive neighbor.

Using the passive IGMP snooping neighbors protocol, each of computer network devices 410-1, 410-3 and 410-4 may build knowledge of the presence of a querier (such as computer network device 410-2), passive neighbors on each of its ports and, thus, the topology of the network. Thus, computer network devices 410-1, 410-3 and 410-4 may compute which ports are edge-ports and which are non-edge ports. For example, information about the network topology shown in FIG. 4 is summarized in Table 1. This information may allow computer network devices 410-1, 410-3 and 410-4 to suppress forwarding of an IGMP report or leave message on a port to source 412 or receivers 414-2. Instead, computer network devices 410-1, 410-3 and 410-4 may selectively forward or flood the IGMP query or IGMP report or leave messages within the network. Moreover, using the computed information, a given computer network device in the network may dynamically enable support for advance features. In some embodiments, an advanced feature may include SDVoE flooding reports on or restricted to non-edge ports in the network. This may avoid manual configuration or intervention and may help a network administrator to more easily deploy SDVoE.

TABLE 1

| Computer Network Device | Router-Ports | Passive-Neighbor Ports | Remarks |
| --- | --- | --- | --- |
| 410-1 (Passive Neighbor) | 1/1/2 | None | Doesn't has a passive-neighbor computer network device connected. |
| 410-2 (Querier) | None | 1/1/2, 1/3 | Querier only has passive neighbors |
| 410-3 (Passive Neighbor) | 1/1/3 | 1/1/2 | It has both passive neighbor and router ports. |
| 410-4 (Passive Neighbor) | 1/1/2 | None | |

In an existing IGMP communication protocol, a querier switch (or router) may periodically send IGMP query messages. Other switches receiving such an IGMP query message may marks the associated ports/link as a router port and may mark themselves as passive switch. Then, the other switches may forward the IGMP query message to other ports.

In the passive IGMP snooping neighbors protocol, a switch (or a router) implementing the protocol may sends IGMP passive neighbor messages periodically on one or more router ports. Another switch receiving one of the IGMP passive neighbor messages may mark the associated ports/links as being passive neighbor port(s). This switch may not forward this IGMP passive neighbor message to other ports. Moreover, other passive switches in a network may repeat these operations to implement passive neighbors protocol.

By performing the passive IGMP snooping neighbors protocol, the switches (and/or routers) in the network may learn or identify: non-edge-ports (ports marked as a router port and a passive neighbor port); and edge-ports (ports not marked as a router port and a passive neighbor port). Using this knowledge, IGMP report or leave messages sent by a receiver or a host can be efficiently flooded and restricted only on the non-edge-ports. This capability may help implementation of enhanced features, such as SDVoE, IGMP v2 true fast leave, etc., without manual intervention.

Note that some embodiments of the communication techniques may be used in conjunction with other features or aspects of Internet Protocol v6 (IPV6), such as multicast listener discovery snooping.

We now describe embodiments of an electronic device, which may perform at least some of the operations in the communication techniques. FIG. 5 presents a block diagram illustrating an example of an electronic device 500 in accordance with some embodiments, such as one of computer 104, one of computer network devices 106, controller 108, one of access points 110 or one of electronic devices 112. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, one or more graphics process units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including, control logic 516, an interface circuit 518 and one or more antennas 520 (or antenna elements). (While FIG. 5 includes one or more antennas 520, in some embodiments electronic device 500 includes one or more nodes, such as nodes 508, e.g., a network node that can be coupled or connected to a network or link, or an antenna node, connector or a metal pad that can be coupled to the one or more antennas 520. Thus, electronic device 500 may or may not include the one or more antennas 520.) For example, networking subsystem 514 can include a Bluetooth® networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 are included in operating system 524 and/or control logic 516 is included in interface circuit 518. In some embodiments, the communication techniques are implemented using information in L1, L1.5 and/or L2 of an Open Systems Interconnection (OSI) model.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 500 and/or networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS ii Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
an interface circuit;
a processor; and
memory configured to store program instructions, wherein, when executed by the processor, the program instructions cause the computer network device to perform operations comprising:
receiving an instance of a message associated with a second computer network device in a network via a port associated with a link between the computer network device and the second computer network device;
based at least in part on the received instance of the message, identifying the port as being a type of port, and not forwarding the instance of the message to one or more additional computer network devices via one or more additional ports; and
providing an additional instance of the message addressed to a given additional computer network device in the one or more additional computer network devices via a given additional port in the one or more additional ports that has not already been identified as being the type of port or has not already been identified as not being the type of port.

2. The computer network device of claim 1, wherein the computer network device comprises a switch or a router.

3. The computer network device of claim 1, wherein the port and the one or more additional ports comprise a router port.

4. The computer network device of claim 1, wherein the operations comprise providing additional instances of the message addressed to the second computer networking device via the port and to the one or more additional computer network devices via the one or more additional ports.

5. The computer network device of claim 4, wherein the additional instances of the message may be provided periodically.

6. The computer network device of claim 5, wherein the additional instances of the message are provided after a predefined time interval.

7. The computer network device of claim 6, wherein, during the predefined time interval, the computer network device listens for communication associated with a host.

8. The computer network device of claim 1, wherein the type of port comprises a passive neighbor port.

9. The computer network device of claim 1, wherein the port comprises a non-edge port in the network.

10. The computer network device of claim 1, wherein the instance of the message comprises a type of message and the operations comprise, when the computer network device receives another type of message via another port associated with a host in the network, providing the other type of message addressed to the second computer network device via the port.

11. The computer network device of claim 10, wherein the operations comprise suppressing forwarding of the other type of message to the host.

12. The computer network device of claim 10, wherein the other type of message comprises an Internet group management protocol (IGMP) report or leave message.

13. The computer network device of claim 1, wherein the operations comprise:
receiving an Internet group management protocol (IGMP) report or leave message; and
forwarding the IGMP report or leave message via non-edge ports in the network.

14. The computer network device of claim 1, wherein the operations comprise computing a topology of the network based at least in part on received instances of the message; and
wherein the topology specifies non-edge ports in the network and edge ports in the network.

15. The computer network device of claim 1, wherein the instance of the message comprises a type of message and the type of message comprises a passive neighbor message.

16. A non-transitory computer-readable storage medium for use in conjunction with a computer network device, the computer-readable storage medium storing program instructions that, when executed by the computer network device, causes the computer network device to perform operations comprising:
receiving an instance of a message associated with a second computer network device in a network via a port associated with a link between the computer network device and the second computer network device;
based at least in part on the received instance of the message, identifying the port as being a type of port, and not forwarding the instance of the message to one or more additional computer network devices via one or more additional ports; and
providing an additional instance of the message addressed to a given additional computer network device in the one or more additional computer network devices via a given additional port in the one or more additional ports that has not already been identified as being the type of port or has not already been identified as not being the type of port.

17. The non-transitory computer-readable storage medium of claim 16, wherein the port and the one or more additional ports comprise a router port.

18. The non-transitory computer-readable storage medium of claim 16, wherein the instance of the message comprises a type of message and the operations comprise, when the computer network device receives another type of message via another port associated with a host in the network, providing the other type of message addressed to the second computer network device via the port.

19. A method for performing a passive snooping communication protocol, comprising:
by a computer network device:
receiving an instance of a message associated with a second computer network device in a network via a port associated with a link between the computer network device and the second computer network device;
based at least in part on the received instance of the message, identifying the port as being a type of port, and not forwarding the instance of the message to one or more additional computer network devices via one or more additional ports; and
providing an additional instance of the message addressed to a given additional computer network device in the one or more additional computer network devices via a given additional port in the one or more additional ports that has not already been identified as being the type of port or has not already been identified as not being the type of port.

20. The method of claim 19, wherein the port and the one or more additional ports comprise a router port.

* * * * *